US010159953B2

(12) United States Patent
Xu (10) Patent No.: US 10,159,953 B2
(45) Date of Patent: Dec. 25, 2018

(54) REACTOR FOR USE WITH AN IONIC LIQUID CATALYST

(71) Applicant: UOP LLC, Des Plaines, IL (US)

(72) Inventor: Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 116 days.

(21) Appl. No.: 15/346,477

(22) Filed: Nov. 8, 2016

(65) Prior Publication Data

US 2017/0189884 A1 Jul. 6, 2017

Related U.S. Application Data

(60) Provisional application No. 62/254,443, filed on Nov. 12, 2015.

(51) Int. Cl.
*B01J 19/00* (2006.01)
*B01J 19/24* (2006.01)

(52) U.S. Cl.
CPC ......... *B01J 19/0053* (2013.01); *B01J 19/242* (2013.01); *B01J 19/2425* (2013.01); *B01J 19/2465* (2013.01); *B01J 2219/00047* (2013.01); *B01J 2219/00094* (2013.01)

(58) Field of Classification Search
CPC .......................... B01J 19/0013; B01J 19/2405
USPC ........................................................ 422/187
See application file for complete search history.

(56) References Cited

U.S. PATENT DOCUMENTS

| | | | |
|---|---|---|---|
| 5,243,083 A | 9/1993 | Cowley et al. | |
| 5,976,355 A * | 11/1999 | Johnson | C10G 11/18 208/119 |
| 5,977,251 A * | 11/1999 | Kao | B01J 19/2435 525/53 |
| 7,731,917 B2 * | 6/2010 | Mori | B01J 8/067 165/140 |
| 2003/0175183 A1* | 9/2003 | Guetlhuber | B01J 8/065 422/600 |
| 2003/0180201 A1* | 9/2003 | Belt | B01J 8/008 422/600 |

(Continued)

FOREIGN PATENT DOCUMENTS

| | | |
|---|---|---|
| EP | 0601599 B1 | 4/1999 |
| EP | 1889659 B1 | 3/2013 |

(Continued)

OTHER PUBLICATIONS

Georg, "Chemical reactions in tube reactors and static mixers—Homogeneity, residence time behavior, heat dissipation, design, application examples", Chemie-Ingenieur-Technik (2005), v 77, n 6, p. 633,681-693.

(Continued)

*Primary Examiner* — Huy Tram Nguyen (57) ABSTRACT

A combined heat exchanger and reactor for use with an ionic liquid catalyst reaction. The reactor includes an outer shell configured to receive a cooling fluid which may remove heat from reactions occurring within hollow members disposed inside of the outer shell. The hollow members preferably include one or more static mixers for mixing fluids and dispersing ionic liquid into droplets. A separation zone may be disposed beneath the hollow members which will separate the effluent and provide a hydrocarbon stream and an ionic liquid stream. Multiple combined heat exchanger and reactor may be arranged in series.

15 Claims, 4 Drawing Sheets

(56) References Cited

U.S. PATENT DOCUMENTS

| | | | | |
|---|---|---|---|---|
| 2004/0091403 A1* | 5/2004 | Filippi | ................... | B01J 8/0285 |
| | | | | 422/198 |
| 2004/0133056 A1* | 7/2004 | Liu | ........................... | C07C 2/58 |
| | | | | 585/721 |
| 2010/0310443 A1* | 12/2010 | Miller | ..................... | B01J 4/002 |
| | | | | 423/324 |
| 2011/0060178 A1* | 3/2011 | Nafis | ........................ | B01J 29/90 |
| | | | | 585/720 |
| 2011/0288343 A1* | 11/2011 | Chen | ....................... | C07C 41/50 |
| | | | | 568/601 |
| 2011/0308995 A1 | 12/2011 | Salazar-Guillen et al. | | |
| 2012/0024750 A1* | 2/2012 | Zhan | ................... | C10G 29/205 |
| | | | | 208/56 |

FOREIGN PATENT DOCUMENTS

| | | | |
|---|---|---|---|
| JP | 2002179601 A | * | 6/2002 |
| WO | 2003011450 | | 2/2003 |
| WO | 2011143975 | | 11/2011 |

OTHER PUBLICATIONS

Streiff, "Don't overlook static-mixer reactors", Chemical Engineering (1994), v 101, n 6, p. 76-80,82.

Mackley, "Using (baffled tubes with) oscillatory flow (can) improve performance (of plug flow reactors, mixing vessels, tubular membrane filters, and heat exchangers", Chemical Engineering (1987), n 433, p. 18-20.

* cited by examiner

REACTOR FOR USE WITH AN IONIC LIQUID CATALYST

CROSS-REFERENCE TO RELATED APPLICATION

This application claims priority from Provisional Application No. 62/254,443 filed Nov. 12, 2015, the contents of which are hereby incorporated by reference.

FIELD OF THE INVENTION

The invention relates to a reactor for use with ionic liquid catalyst, preferably in an alkylation process, more particularly, the invention relates to a tubular reactor and heat exchanger for use with ionic liquid catalyst.

BACKGROUND OF THE INVENTION

Ionic liquids are essentially salts in a liquid state, and are described in U.S. Pat. No. 4,764,440, U.S. Pat. No. 5,104,840, and U.S. Pat. No. 5,824,832. The properties vary extensively for different ionic liquids, and the use of ionic liquids depends on the properties of a given ionic liquid. Depending on the organic cation of the ionic liquid and the anion as well as temperatures, the ionic liquid can have very different properties.

Acidic ionic liquid may be used as a catalyst in various chemical reactions, such as the alkylation of iso-butane with olefins. The reaction of iso-butane with olefins to produce an alkylate product is a highly exothermic reaction. One way to control the temperature of the reactor and system is by vaporizing a portion of the light hydrocarbons. However, controlling the temperature by vaporization is undesirable because it makes the reactor operation, the ionic liquid dispersion, and the acid concentration more difficult to control. Therefore, it is believed to be more desirable to control the temperature while the reactants and products are maintained in liquid phase.

Indeed, maintaining the reactants and products in liquid phase allows for heat exchange with cooling or process fluid to be utilized to remove heat from the liquid mixture of reactants and products. While passing a liquid stream with a mixture of reactants and products from a reactor to a heat exchanger may be an effective and efficient design, there are benefits associated with combining the reactor and heat exchanger into a single unit. For example, the combination of the reactor and heat exchanger into one unit can reduce piping, plot space and costs.

However, current designs for such combined units are not properly configured to be effectively and efficiently utilized for use with ionic liquid catalyst processes. For example, one current designs of such a combined reactor and heat exchanger utilizes pump impellers for fluid mixing, dispersion and circulation. The process fluid is on the shell side of the heat exchanger with limited fluid velocities, and thus the heat transfer would be poor for a fluid containing viscous liquid acid catalyst. In addition, a wide distribution of dispersed-phase liquid droplets and emulsion fluid are created by the high shear pump impellers, which makes downstream separation of the dispersed liquid droplets of ionic liquid catalyst difficult.

Therefore, there remains a need for a design of a combined reactor and heat exchanger that can be used in association with ionic liquid catalyst.

SUMMARY OF THE INVENTION

A combined reactor and heat exchanger and a process of using same have been invented. The combined reactor and heat exchanger allows for heat to be removed from the reaction effectively. Additionally, the combined reactor and heat exchanger accommodates the dispersion of the ionic liquid into droplets to catalyze the reaction, while allowing the droplets to be efficiently suspended in the liquid phase. In one particularly preferred aspect, unlike current designs, the process fluid flows through inside the heat exchanger tubes while the cooling fluid flows on the shell side. Additionally, in a particularly preferred design, static mixers may be installed inside the tubes for ionic liquid dispersion and fluid mixing. As the process fluid flows through inside tubes with high velocities (e.g. larger than 10 ft/s) through static mixers, the heat transfer is greatly improved. With static mixers, more uniform droplets of dispersed phase are generated, which makes downstream separation easier.

Therefore, in one aspect of the invention, the present invention may be characterized broadly as providing a reactor for an ionic liquid catalyzed reaction, the reactor comprising: an outer shell, the outer shell including an inlet for a cooling fluid and an outlet for the cooling fluid; a hollow member disposed in the outer shell and having a first open end, a second open end opposite the first open end, and at least one static mixer disposed in the hollow member; and, a separation zone in fluid communication with the hollow member and configured to separate an effluent into an ionic liquid stream and a hydrocarbon stream.

The reactor may further comprise a plurality of hollow members disposed in the outer shell, each hollow member comprising a first opening at a first end and a second opening at a second end opposite the first end, and at least one static mixer disposed in each hollow member. The first reactor may also further comprise a manifold in fluid communication with the first ends of the hollow members. Each hollow member may include at least one static mixer disposed at the first end of the hollow member and proximate the manifold. At least one static mixer may be disposed at the second ends of the hollow members.

The reactor may further comprise a second outer shell disposed between the outer shell and the separation zone. The second outer shell may comprise: an inlet for cooling fluid; an outlet for the cooling fluid; and, at least one hollow member disposed within the second outer shell, the at least one hollow member disposed within the second outer shell having a first open end, a second open end opposite the first end, and a static mixer disposed within the at least one hollow member disposed within the second outer shell. The reactor may further comprise a plurality of hollow members disposed within both of the first outer shell and the second outer shell, a manifold in fluid communication with the first open ends of the hollow members in the first outer shell, and, a manifold in fluid communication with the second open ends of the hollow members in the first outer shell and the first open ends of the hollow members in the second outer shell.

The outer shell may have a horizontal cross sectional size, and the separation zone may comprise a vessel having a horizontal cross sectional size larger than the horizontal cross sectional size of the outer shell.

The separation zone may include a vertical baffle extending downward from a top of the vessel in the separation zone.

The hollow member may comprise an outer hollow member, and the reactor may comprise an inner hollow member disposed in the outer hollow member. The inner hollow member may include an open end and a closed end, and a plurality of discharge openings disposed between the open end and the closed end. At least one static mixer may be disposed in an annulus between the outer hollow member and the inner hollow member.

The reactor may further comprise a plurality of outer hollow members and a plurality of inner hollow members, each outer hollow member surrounding at least one inner hollow member. The reactor may further comprise a manifold configured to receive an ionic liquid stream and distribute ionic liquid to the plurality of outer hollow members.

The reactor may further comprise a line configured to pass at least a portion of a reactor effluent from the reactor to a second reactor, the second reactor may comprise an outer shell having an inlet for cooling fluid, an outlet for cooling fluid, and, at least one hollow member disposed inside of the outer shell of the second reactor.

In another aspect of the invention, the present invention may be characterized broadly as providing a reactor for an ionic liquid catalyzed alkylation reaction, the reactor comprising: a plurality of vertically orientated sections arranged in series and a separation zone, wherein each vertically orientated section comprises: an outer shell, the outer shell including an inlet for a cooling fluid and an outlet for the cooling fluid; a manifold configured to receive an ionic liquid stream and at least one hydrocarbon stream; and, a plurality of hollow members each having a first end in communication with the manifold, a second end, and at least one static mixer disposed between the first end and the second end; and, wherein the separation zone is disposed beneath the plurality of vertically orientated sections.

The manifold of each vertically orientated section may be configured to receive a fresh hydrocarbon stream.

Each hollow member from the plurality of hollow members may include at least two static mixers.

In yet a further aspect of the invention, the present invention may be characterized broadly as providing a reactor for an ionic liquid catalyzed alkylation reaction, the reactor comprising: an outer shell comprising an inlet for a cooling fluid and an outlet for the cooling fluid; a plurality of outer hollow members disposed in the outer shell; an inner hollow member disposed in each of the outer hollow members, and each inner hollow member including an open end, a closed end, and plurality of discharge openings between the open end and the closed end; at least one static mixer disposed in the outer hollow member; and, a separation zone in communication with the plurality of hollow members and configured to separate an effluent into an ionic liquid stream and a hydrocarbon effluent stream.

The reactor may further comprise a first manifold configured to receive and distribute an ionic liquid catalyst stream, a second manifold configured to receive and distribute a first hydrocarbon stream, and, a third manifold configured to receive and distribute a second hydrocarbon stream.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, a various designs for a combined heat exchanger and a reactor have been invented in which the combined reactor and heat exchanger allows for heat to be removed from a reaction catalyzed by ionic liquid. In order to disperse the ionic liquid, static mixers may be used. Cooling fluid, flowing within a shell, may surround multiple tubes in which the ionic liquid catalyzes a reaction.

With these general principles in mind, one or more embodiments of the present invention will be described with the understanding that the following description is not intended to be limiting.

Figure 1:
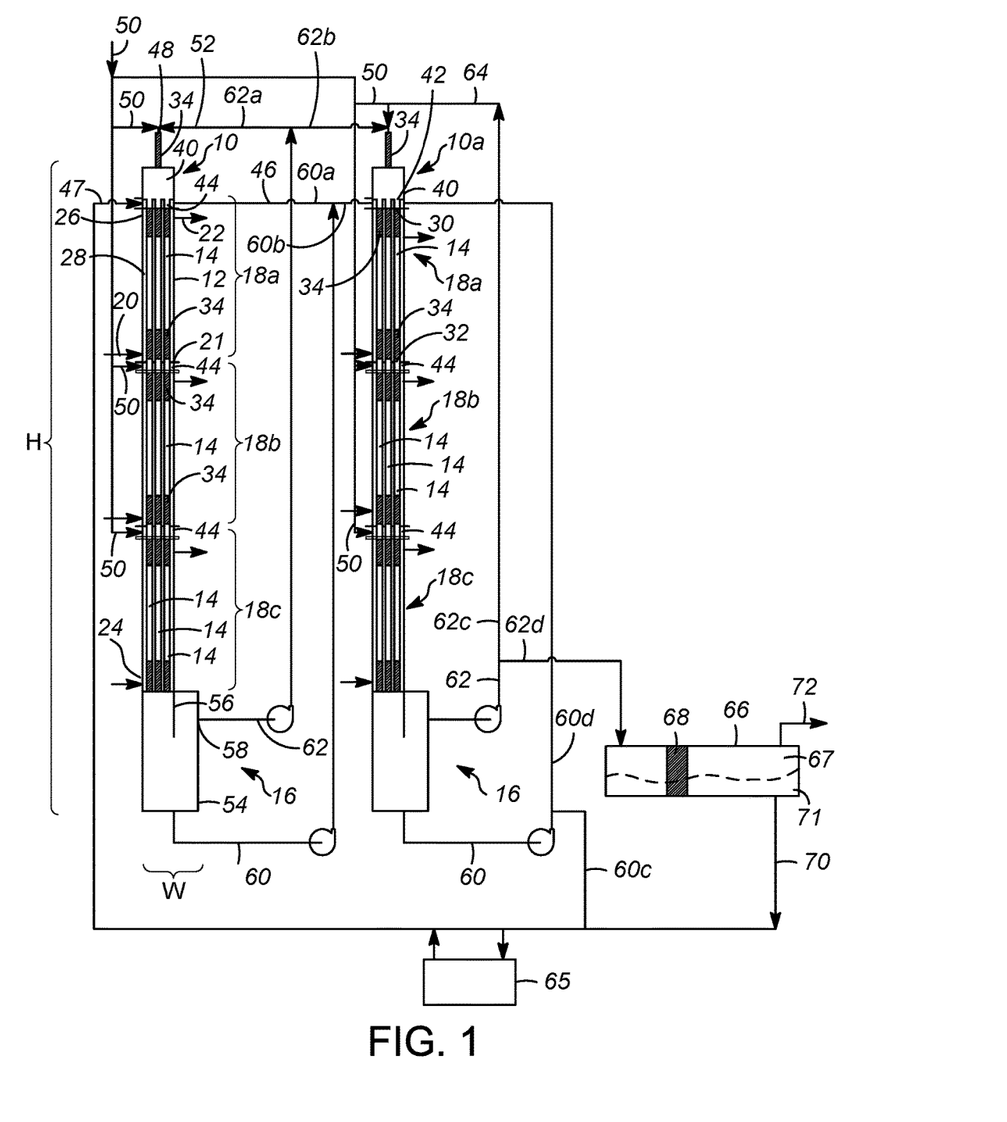
FIG. 1 shows a schematic process flow diagram of a reactor system according to one or more embodiments of the present invention.

As shown in FIG. 1, a reactor 10 according to one or more embodiments of the present invention comprises an outer shell 12, at least one hollow member 14 disposed within the outer shell 12, and a separation zone 16 disposed beneath the at least one hollow member 14. The reactor 10 may be a vertically orientated reactor, meaning that the reactor 10 has a height H that is much greater than its width W. Preferably the outer shell 12 and the hollow member 14 are tubular or include a circular cross section. However, other shapes and cross sectional designs may be utilized.

In FIG. 1, the reactor 10 comprises a stack that includes a plurality of sections 18a, 18b, 18c, preferably generally identical to each other, with each having an outer shell 12 and one or more hollow members 14 disposed within each outer shell 12. This configuration allows the reactor 10 to be a modular design. Furthermore, each of the sections 18a, 18b, 18c may be vertically orientated. Thus, sections 18a, 18b, 18c may be added or removed from the stack, and various reactors 10 of differing sizes may be constructed from identical, or nearly identical, sections 18a, 18b, 18c. Such a configuration is merely preferred, and the reactor 10 may simply comprise a single outer shell 12 and a hollow member 14 disposed within the outer shell 12.

Each outer shell(s) 12 includes an inlet 20 for cooling fluid and an outlet 22 for cooling fluid. Preferably, the inlet 20 for the cooling fluid is disposed proximate a lower end 24 of the outer shell 12 and the outlet 22 for the cooling fluid is disposed proximate an upper end 26 of the outer shell 12. The cooling fluid will remove heat from the process fluid inside of the hollow member 14 via heat exchange. Accordingly, the cooling fluid at the outlet 22 will have a higher temperature than the cooling fluid at the inlet 20. A space 28 between the hollow member 14 and the outer shell 12 may include various baffles or other structures (not shown) to control the flow of the cooling fluid therein.

As mentioned above, at least one hollow member 14, such as a tube, is disposed within each outer shell 12. Preferably, a plurality of hollow members 14 are disposed within each outer shell 12. Each hollow member 14 may comprise a first open end 30 and a second open end 32 opposite the first open end 30. The first open end 30 allows for the hollow member 14 to receive hydrocarbon reactants and ionic liquid catalyst (discussed below) and the second open end 32 provides an effluent that includes reaction products, unreacted reactants, and ionic liquid catalyst.

In order to distribute and disperse the ionic liquid and sufficiently mix the fluids within the hollow member 14, at least one static mixer 34 is disposed within each hollow member 14. Static mixers 34 are commonly used in liquid-liquid dispersion and mixing instead of mechanical stirred reactors.

Any number of static mixers 34 may be used, for example, one static mixer 34 may be disposed proximate the first end 30 of the hollow member 14 and one static mixer 34 may be disposed proximate the second end 32 of the hollow member 14. The exact configuration of the static mixer 34 is not necessary for practicing the present invention so long as the static mixer 34 facilitates the dispersing of the ionic liquid into droplets, and mixes the reactants and ionic liquid catalyst sufficiently. Each static mixer 34 typically has multiple (e.g. five, ten, or fifteen) elements (and the length of each element is normally 1.0 to 1.5 times the inside diameter of the hollow member 14. Adjacent elements may rotate from each other by certain degrees (e.g. by) 90°. As will be appreciated the static mixers 34 may have any number of configurations or designs. One such static mixer comprises an SMV™ mixer available from Sulzer Ltd., headquartered in Winterthur, Switzerland.

Figure 2:
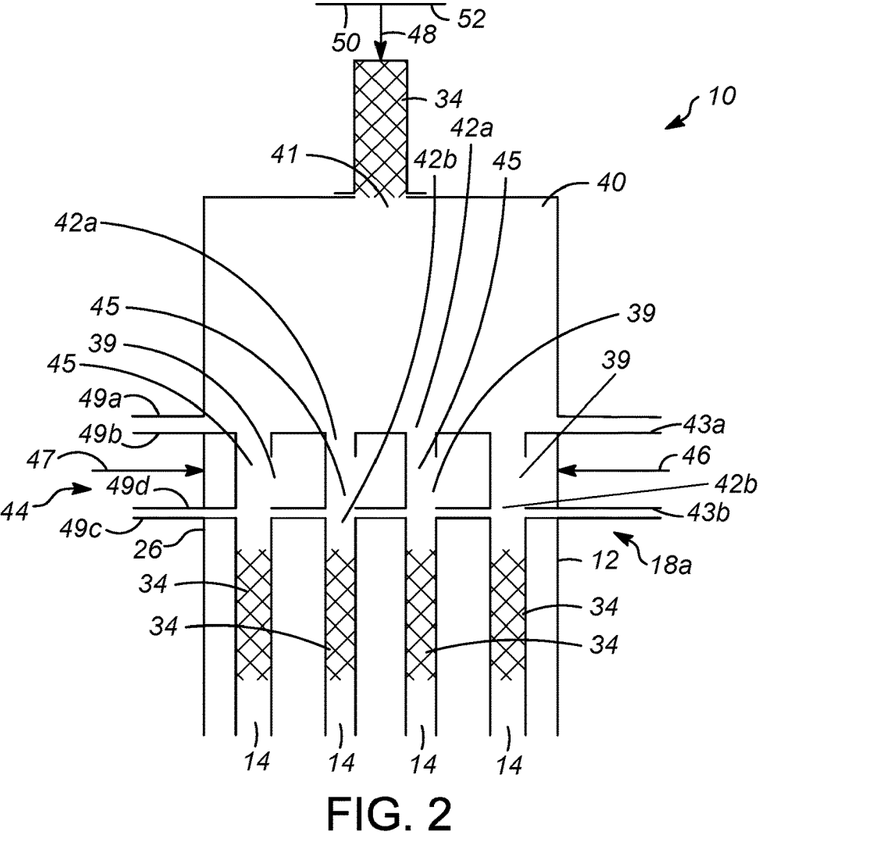
FIG. 2 shows a side cutaway view of an upper portion of the combined reactor and heat exchanger shown in FIG. 1.

Disposed above the upper end 26 of the outer shell 12 of the reactor 10 is a section manifold 44, which as shown in FIG. 2 includes and a plenum 40 having an inlet 41. Continuing in FIG. 2, the section manifold 44 which contains hollow members 45 that are preferably aligned with the hollow members 14 in the shell 12 and which transfer fluids from the plenum 40, above the section manifold 44, to the hollow members 14 in the shell 12 below the section manifold 44. In addition, the hollow members 45 in the section manifold 44 each have at least one sidewall opening 39 for introducing ionic liquid or hydrocarbon reactants into each of the hollow members 45 in the section manifold 44. As depicted, the section manifold 44, associated with the uppermost section 18a of the reactor 10 may receive two ionic liquid streams 46, 47, one of which may comprise a circulating stream and a recycle stream which will be discussed in more detail below. The section manifolds 44 associated with the second and third sections 18b, 18c of the reactor 10 receives and distributes hydrocarbon reactants containing olefins 50. It is critical for the section manifolds 44 to distribute ionic liquid catalyst and hydrocarbon reactants uniformly to each of the hollow members 14 in the shell 12 to maximize the desired reaction products and minimize side reactions.

At a top of the reactor 10 is the plenum 40 that receives and distributes the fluids of the hydrocarbon stream to the section manifold 44 of the uppermost section 18a of the reactor 10. The use of the section manifolds 44 and plenum 40 is to achieve the initial uniform distribution of ionic liquid and hydrocarbon reactants to each of the hollow members 14 in the shell 12 throughout the sections 18a, 18b, 18c of the reactor 10.

In the embodiments of the present invention depicted in FIGS. 1 and 2, which is merely exemplary, a stream of hydrocarbons 48 may be passed to the plenum 40 of the reactor 10. The stream of hydrocarbons 48 may be a fresh stream 50 comprising olefins and isobutane, a circulating hydrocarbon stream 52 (discussed below), or a mixture thereof. Although it is depicted as that a single stream of hydrocarbons 48 of is passed to the plenum 40, multiple hydrocarbons streams may be passed into the plenum 40. Prior to entering the plenum 40, the stream of hydrocarbons 48 may pass through a static mixer 34. Thus, after passing through the static mixer, the stream of hydrocarbons may pass through the inlet 41 and into the plenum 40.

The section manifold 44 may be constructed with two plates 43a, 43b at upper and lower ends, respectively, of the section manifold 44, with each plate 43a, 43b comprising a tube sheet. The hollow members 45 of the section manifold 44 may be attached to the plates 43a, 43b through welding, expansion or other suitable processes for obtaining acceptable levels of mechanical integrity and sealing between the plates 43a, 43b and the hollow members 45 of the section manifold 44. Apertures 42a in the upper plate 43a allow for fluids in the plenum 40 to pass into the hollow members 45 of the section manifold 44. A flange 49a on the plenum 40 may be secured to a flange 49b on the upper plate 43a of the section manifold 44 with any suitable fastening device or means. In the hollow members 45 of the section manifold 44, the hydrocarbons from the plenum 40 will mix with ionic liquid (from streams 46, 47), that may pass into the hollow members 45 of the section manifold 44 via the sidewall openings 39 in the hollow members 45 of the section manifold 44. From the section manifold 44, the mixture of hydrocarbons and ionic liquid may pass into the hollow members 14 in the shell 12 via apertures 42b in the lower plate 43b of the section manifold 44. A flange 49c on the shell 12 may be secured to a flange 49d on the lower plate 43b of the section manifold 44 with any suitable fastening device or means.

As the hydrocarbons and ionic liquid move downward through the hollow members 14 in the shell 12, the static mixers 34 in the hollow members 14 in the shell 12 will mix the hydrocarbons and ionic liquid and will disperse the ionic liquid into droplets within the hollow member 14 in the shell 12. As reactions occur within the hollow member 14 in the shell 12, cooling fluid in the space between hollow members 14 in shell 12 may absorb heat. An effluent, comprising a mixture of ionic liquid, unreacted reactants, and reaction products can pass out of the second end 32 of the hollow members 14 in the shell 12.

In embodiments comprising multiple sections 18a, 18b, 18c, such as those depicted in FIG. 1 for example, the effluent from a first section 18a of the reactor 10 flows into the section manifold 44 of a second section 18b. Additionally, a fresh stream of the hydrocarbon stream 50 containing olefins may also be passed to the section manifold 44 of the second section 18b. The mixing, reaction, and cooling of the process fluids within the second section 18b will occur in the same manner as in the first section 18a.

A third section 18c can be included as depicted, with the third section 18c receiving the effluent from the second section 18b. A fresh stream of the olefinic hydrocarbon stream 50 may be passed to the section manifold 44 of the third section 18c. Again, the number of sections 18a, 18b, 18c of the reactor 10 may vary.

Figure 3:
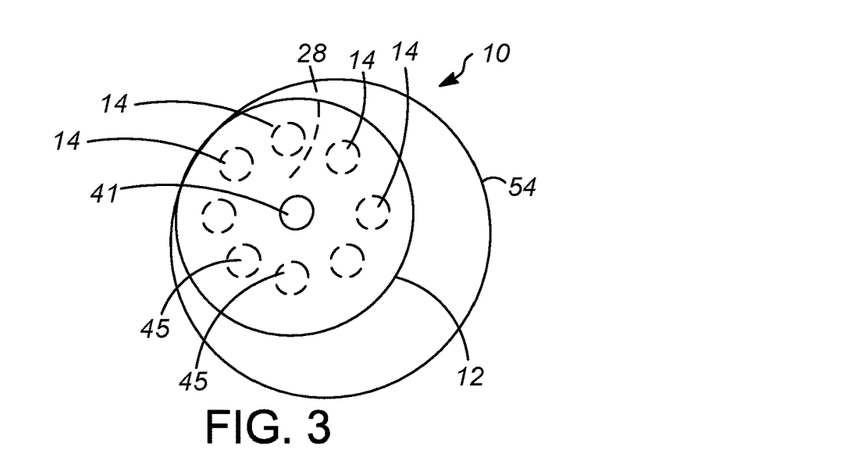
FIG. 3 shows a top view of a combined reactor and heat exchanger according to one or more embodiments of the present invention.

The effluent from the hollow members 14 in the last section may pass into the separation zone 16 of the reactor 10. As shown in FIG. 1, the separation zone includes a separation vessel 54. As can be seen in FIG. 3, the horizontal cross sectional size (or foot print) of the vessel 54 in the separation zone 16 is preferably larger than a horizontal cross sectional size of the outer shell 12. For example, if both the vessel 54 in the separation zone 16 and the outer shell 12 have circular horizontal cross sectional shapes, the circumference of the vessel 54 in the separation zone 16 is preferably larger than the circumference of the outer shell 12. Returning to FIG. 1, the separation vessel 54 preferably includes a vertical baffle 56 extending downward in the separation vessel 54 to partially separate the second ends 32 of the hollow members 14 from an outlet 58 for a hydrocarbon phase. The use of the vertical baffle 56 and the sizing of the separation vessel 54 provides a better separation between an ionic liquid phase and a hydrocarbon phase within the separation vessel 54.

Within the separation vessel 54 of the separation zone 16, the heavier ionic liquid will flow downwards in the separation vessel 54, while the lighter hydrocarbon phase will flow upward. Accordingly, the separation zone 16 may provide an ionic liquid stream 60 and a hydrocarbon stream 62. The ionic liquid stream 60, or at least a portion 60a thereof, may be passed back as a circulating stream for one of the ionic liquid streams 46, 47 passed into the reactor 10. Similarly, the hydrocarbon stream 62 or at least a portion 62a thereof, may be passed back as the circulating hydrocarbon stream 52. A second portion of the hydrocarbon stream 62 may be passed to a secondary separation vessel 66 (discussed below) via a line 62b, or, in some embodiments, to a second reactor 10a as shown in FIG. 1. Any number of reactors 10, 10a may be included, preferably in configurations with multiple reactors 10, 10a, the reactors 10, 10a are arranged in series.

Accordingly, the second reactor 10a receives one or more ionic liquid streams 60b, 60d. The second reactor 10a also receives a portion of the fresh hydrocarbon stream 50. The second reactor 10a also preferably receives a second portion 62b of the hydrocarbon stream 62 from the separation zone 16 of the first reactor 10. Finally, the second reactor may also receive a circulating hydrocarbon stream 64. The hydrocarbons streams 50, 62b, 64 passed to the second reactor 10a may be combined, passed through a static mixer 34 and then passed into the plenum 40 of the second reactor 10a. The second reactor 10a may be configured to operate the same as or similar to the first reactor 10, and thus the above description is incorporated herein.

As with the first reactor 10 (as shown in FIG. 2), a section manifold 44 associated with an upper section 18a of the second reactor 10a receives ionic liquid streams 60b and 60d and hydrocarbon streams 50, 62b, and 64 and distributes them uniformly to each of the hollow members 14 in the upper section 18a of the second reactor 10a. The section manifolds 44 associated with the second and third sections 18b, 18c of the second reactor 10a receive reaction effluent from an upper (or upstream) section and a fresh reactant stream 50 containing olefins and distribute these fluids uniformly to each of the hollow members 14 in the sections 18b, 18c below (or downstream).

From the separation zone 16 of the second reactor 10a, a portion 60c of the ionic liquid stream 60 may be passed to the first reactor 10 as the ionic liquid streams 47. A regeneration zone 65 may be used to regenerate portions of the ionic liquid in the stream passed back to the first reactor 10. Such regeneration zones 65 are known in the art. A second portion 60d of the ionic liquid stream 60 from the separation zone 16 of the second reactor 10a is passed back to the second reactor 10a.

A portion 62c of the hydrocarbon stream 62 from the separation zone 16 of the second reactor 10a may be the circulating hydrocarbon stream 64 passed to the second reactor 10a. A second portion 62d of the hydrocarbon stream 62 from the separation zone 16 of the second reactor 10a may be passed to the secondary separation vessel 66.

The secondary separation vessel 66 may comprise a horizontally configured vessel in which a hydrocarbon phase 67 including reaction products and unreacted reactants, can separated, via gravity from an ionic liquid phase 71. However, the lighter hydrocarbon phase 67 will likely include entrained ionic liquid droplets. In order to remove these droplets from the hydrocarbon phase 67 a coalescing material 68 or other similar device may be disposed within the secondary separation vessel 66. As is known such coalescing material 68 helps coalesce the entrained droplets and facilitate the separation of ionic liquid droplets from hydrocarbons. The coalescing material 68 may comprise a mesh other similar material or device.

An ionic liquid stream 70 from the secondary separation vessel 66 may be passed to the first reactor 10, and may be combined with the stream 60c from the separation zone of the second reactor 10a, and may also pass to the regeneration zone 65. A hydrocarbon effluent 72 from the secondary separation vessel 66 may be passed to a product recovery zone (not shown) which may comprise one or more fractionation columns configured to separate the components of the hydrocarbon effluent 72 into various streams including a product stream and a reactant stream which may be recycled to the first reactor 10 via top plenum (not shown) or mixed with fresh hydrocarbon stream (not shown).

Figure 4:
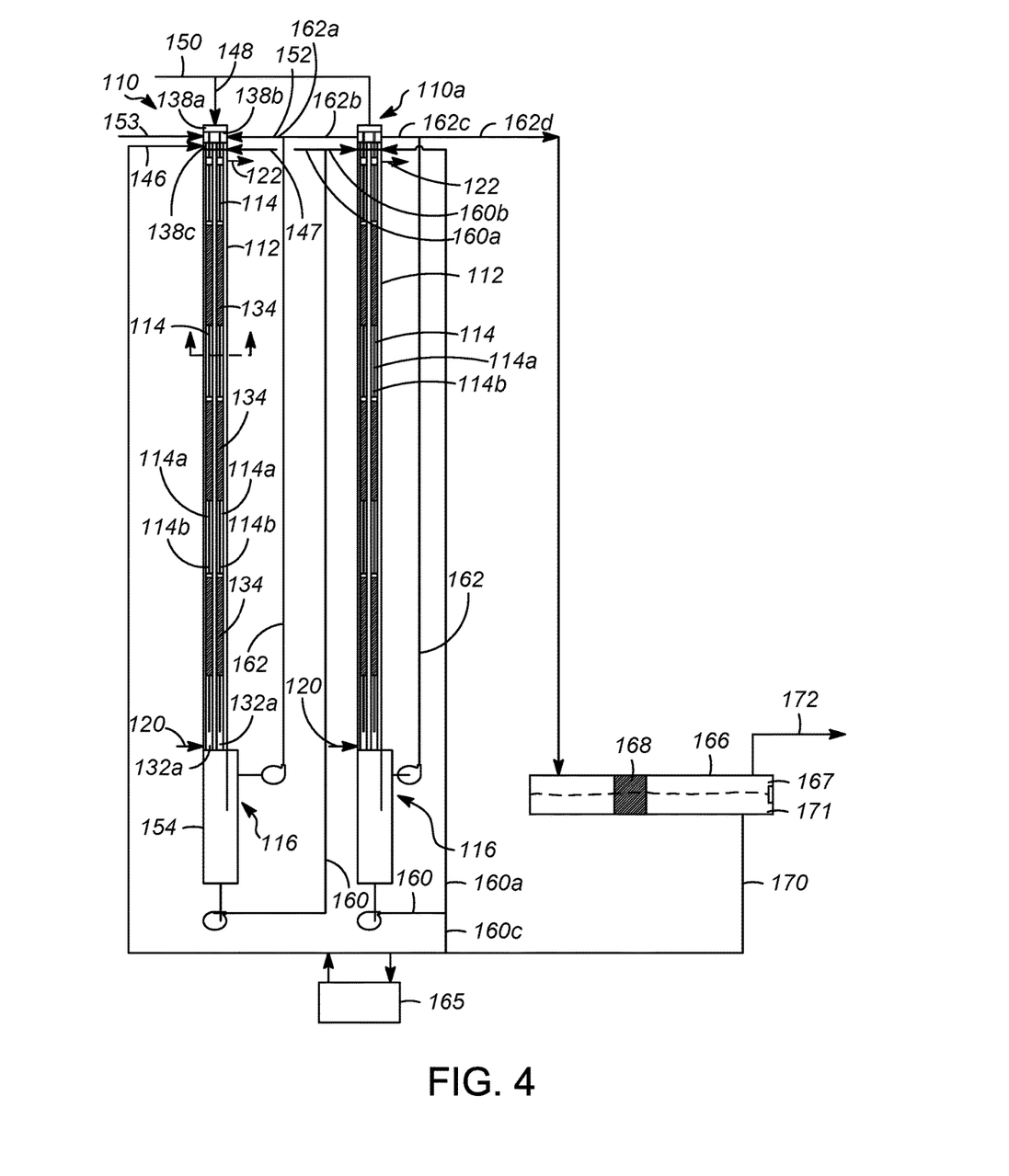
FIG. 4 shows another schematic process flow diagram of a reactor system according to one or more embodiments of the present invention.

In FIG. 4, another reactor 110 is depicted in which similar features, elements and devices may be depicted with similar reference numerals that have been increased by 100. The depicted reactor 110 also comprises an outer shell 112, at least one hollow member 114 disposed within the outer shell 112, and a separation zone 116 disposed beneath the at least one hollow member 114.

The outer shell 112, similar to the outer shell 12 in the previously discussed embodiment, includes an inlet 120 for a cooling fluid and an outlet 122 for the cooling fluid. Again, the cooling fluid is passed through spaces between hollow members 114 disposed within the outer shell 112 to remove heat from the reactions occurring within the hollow members 114.

Figure 5:
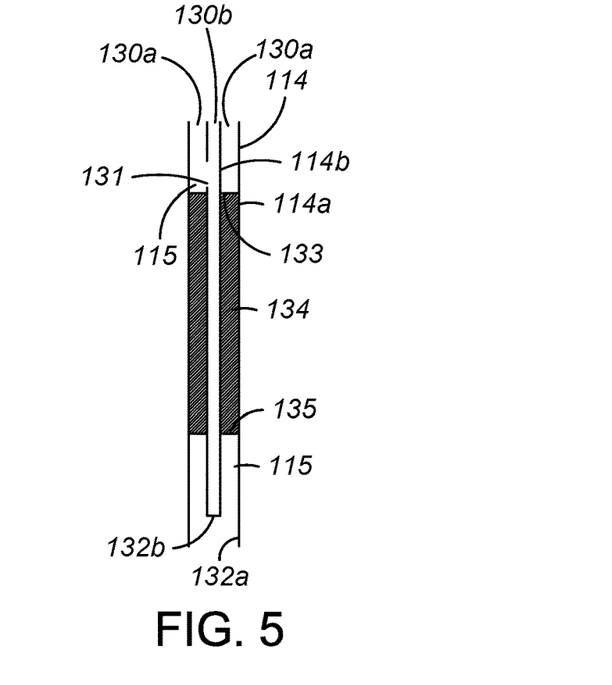
FIG. 5 shows a side cutaway view of a portion of a combined reactor and heat exchanger according to one or more embodiments of the present invention; and, FIG. 6 shows another side cutaway view of the combined reactor and heat exchanger shown in FIG. 4.

The reactor 110 preferably includes a plurality of hollow members 114. Turning to FIG. 5, most preferably, the reactor 110 includes a plurality of outer hollow members 114a having a first end 130a and a second end 132a and a plurality of inner hollow members 114b having a first end 130b and a second end 132b. An inner hollow member 114b is disposed within each of the outer hollow members 114a, preferably forming an annulus 115.

As shown in FIG. 5, both ends 130a, 132a of the outer hollow members 114a are preferably open. The first ends 130b of the inner hollow members 114b are open and thus comprise open ends, while the second ends 132b are closed and thus comprise closed ends. The inner hollow member 114b are preferably extended through all static mixers 134 within a hollow member 114 and the closed end 132b is below the lowest static mixer 134 disposed between the outer hollow members 114a and the inner hollow member 114b. Disposed between the first ends 130b and the second ends 132b of the inner hollow members 114b are a plurality of discharge openings 131.

At least one static mixer 134 is disposed between the outer hollow members 114a and the inner hollow member 114b. Preferably, at least some of the discharge openings 131 of the inner hollow member 114b are disposed proximate the static mixers 134. For example, discharge openings 131 may be disposed near an upper end 133 of the static mixer 134 for fluid flow down through the annulus 115 so that fluid passed from the inner hollow member 114b to the outer hollow member 114a mixes well with the downward flowing fluid in the outer hollow member 114a through the static mixer 134. Other configurations may also be utilized, for example, with a static mixer 134 disposed near a lower end 135 of the static mixer 134.

Figure 6:
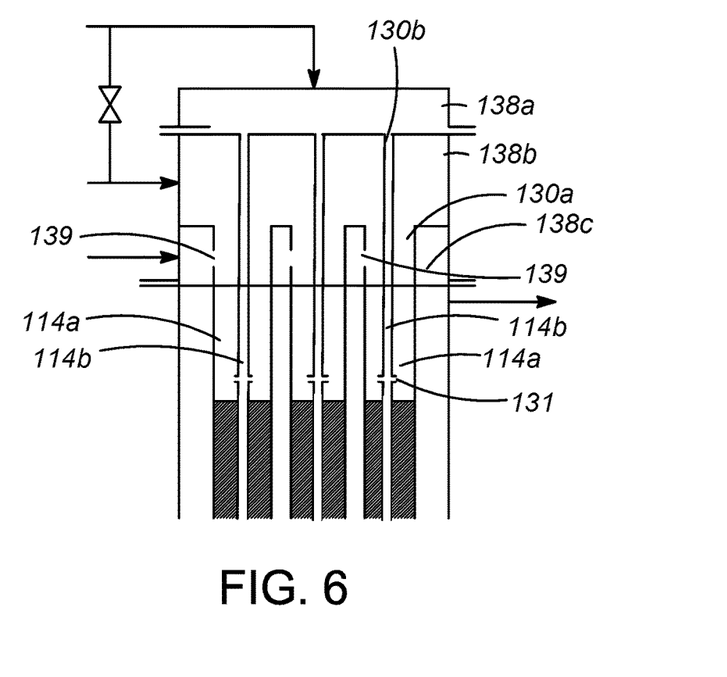

As shown in FIG. 6, the reactor 110 preferably includes a first manifold 138a in fluid communication with the inner hollow members 114b of the reactor 110, preferably via the first ends 130b of the inner hollow members 114b. The outer hollow members 114a are preferably in fluid communication with a second manifold 138b, and, preferably, also in fluid communication with a third manifold 138c. More specifically, the second manifold 138b may be in communication with the first ends 130a of the outer hollow members 114a. The third manifold 138c may be in communication with the outer hollow members 114a via sidewall openings 139 or orifices disposed in the wall of the outer hollow members 114a. These sidewall openings 139 are preferably sized to control the flow fluids into the outer hollow member 114a from the third manifold 138c so that each of outer hollow member 114a receives similar amount of fluid distributed through the third manifold 138c.

Returning to FIG. 4, in an exemplary embodiment, a first hydrocarbon stream 148, which may comprise a portion of a fresh stream 150 comprising olefins and isobutane, may be passed into the first manifold 138a of the reactor 110 and distributed to the inner hollow members 114b. A second stream of hydrocarbons 152, preferably comprising a circulating stream, and a third stream of hydrocarbons 153, preferably comprising a recycle stream, may be passed into the second manifold 138b. From the second manifold 138b, the reactants in the second stream of hydrocarbons 152 and the third stream of hydrocarbons 153 may be passed into the outer hollow members 114a. One or more ionic liquid steams 146, 147 may be passed into the third manifold 138c. From the third manifold 138c, the ionic liquid may pass into the outer hollow members 114a via the sidewall openings 139 (see FIG. 6).

The fluids within the outer and inner outer hollow members 114a, 114b will flow downward. The static mixers 134 in the outer hollow members 114a will mix the reactants and ionic liquid catalyst as well as disperse the ionic liquid into droplets. The reactants containing olefins in the inner hollow members 114b may be injected into the outer hollow member 114a via the discharge openings 131. The reactants, in the presence of the ionic catalyst, will react in the space between the inner hollow member 114b and the outer hollow member 114a. Cooling fluid flowing in the shell 112 outside of the outer hollow member 114a may remove heat generated by the reaction. The fluids in the outer hollow member 114a will continue to travel downward and be mixed via the static mixers 134 with reactant from the inner hollow members 114b proximate the discharge openings 131 (see FIG. 5) as the fluids travel downward. Eventually, an effluent will pass out from the second ends 132a of the outer hollow members 114b and into the separation zone 116.

As depicted in FIG. 4, each hollow member 114a and 114b in the reactor may include multiple static mixers 134 and multiple discharge openings 131 near the top of each static mixer 134. Again, each of the static mixers 134 may include multiple (e.g. five, ten, or fifteen) elements and the length of each element is normally 1.0 to 1.5 times the inside diameter of the outer hollow member 114a. The adjacent elements of the static mixer 134 may rotate from each other by certain degrees (e.g. 90°).

In the separation zone 116, the effluent will be separated into an ionic liquid phase and a hydrocarbon phase. The separation zone 116 may include a separation vessel 154 disposed beneath the hollow members 114. The separation vessel 154 may include the same features as the separation vessel 54 discussed above.

An ionic liquid stream 160 may be withdrawn from the separation vessel 154. A first portion 160a of the ionic liquid stream 160 may be used a circulating stream and passed as the ionic liquid streams 147 to the reactor. A hydrocarbon stream 162 may also be withdrawn from the separation vessel 154. A first portion 162a of the hydrocarbon stream 162 may be used as the hydrocarbon stream 152 passed to the reactor 110, i.e., as a circulating stream. A second portion 162b of the hydrocarbon stream 162 from the separation vessel 154 may be passed to a second reactor 110a. The second reactor 110a may also receive a second portion 160b of the ionic liquid stream 160 withdrawn from the separation vessel 154. The use of multiple reactors 110, 110a is, again, merely exemplary and is not intended to be limiting.

The second reactor 110a may also be the same as the first reactor 110. The above description of same is incorporated herein. From the separation zone 116 of the second reactor 110a a portion 160c of the ionic liquid stream 160 may be passed to the first reactor 110 and a portion 160a may be circulated back to top of the second reactor 110a. Again, a portion 162c of the hydrocarbon stream 162 from the separation zone 116 of the second reactor 110a may be circulated back to top of the second reactor 110a and a portion 162d of the hydrocarbon stream 162 from the separation zone 116 of the second reactor 110a may be passed to a secondary separation vessel 166 which may be the same as the secondary separation vessel 166 described above with respect to the embodiments of the present invention depicted in FIG. 1.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention. Additionally, as depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

It should also be appreciated that the foregoing preferred embodiments were merely exemplary and that one of ordinary skill in the art will appreciate the modifications and changes to the combined heat exchanger and reactor could be implemented.

In sum, in the various aspects, embodiments and configurations of the present invention, the use of the outer shell allows for cooling fluid to be used to control the heat of the reaction catalyzed by the ionic liquid, allowing ionic liquid catalyst to be efficiently and effectively used to catalyze various reactions.

Specific Embodiments

While the following is described in conjunction with specific embodiments, it will be understood that this description is intended to illustrate and not limit the scope of the preceding description and the appended claims.

A first embodiment of the invention is a reactor for an ionic liquid catalyzed reaction, the reactor comprising an outer shell, a hollow member, and a separation zone, the outer shell including an inlet for a cooling fluid and an outlet for the cooling fluid, the hollow member disposed in the outer shell and having a first open end, a second open end opposite the first open end, and at least one static mixer disposed in the hollow member, and, the separation zone in fluid communication with the hollow member and configured to separate an effluent into an ionic liquid stream and a hydrocarbon stream. An embodiment of the invention is one, any or all of prior embodiments in this paragraph up through the first embodiment in this paragraph wherein the reactor further comprises a plurality of hollow members disposed in the outer shell, each hollow member comprising a first opening at a first end and a second opening at a second end opposite the first end, and at least one static mixer disposed in each hollow member. An embodiment of the invention is one, any or all of prior embodiments in this paragraph up through the first embodiment in this paragraph, wherein the first reactor further comprises a manifold in fluid communication with the first ends of the hollow members. An embodiment of the invention is one, any or all of prior embodiments in this paragraph up through the first embodiment in this paragraph, wherein each hollow member includes at least one static mixer disposed at the first end of the hollow member and proximate the manifold. An embodiment of the invention is one, any or all of prior embodiments in this paragraph up through the first embodiment in this paragraph further comprising at least one static mixer disposed at the second ends of the hollow members. An embodiment of the invention is one, any or all of prior embodiments in this paragraph up through the first embodiment in this paragraph further comprising a second outer shell disposed between the outer shell and the separation zone, the second outer shell comprising an inlet for cooling fluid, an outlet for the cooling fluid, and, at least one hollow member disposed within the second outer shell, the at least one hollow member disposed within the second outer shell having a first open end, a second open end opposite the first end, and a static mixer disposed within the at least one hollow member disposed within the second outer shell. An embodiment of the invention is one, any or all of prior embodiments in this paragraph up through the first embodiment in this paragraph further comprising a plurality of hollow members disposed within both of the first outer shell and the second outer shell, a manifold in fluid communication with the first open ends of the hollow members in the first outer shell, and, a manifold in fluid communication with the second open ends of the hollow members in the first outer shell and the first open ends of the hollow members in the second outer shell. An embodiment of the invention is one, any or all of prior embodiments in this paragraph up through the first embodiment in this paragraph, wherein the outer shell has a horizontal cross sectional size, and wherein the separation zone comprises a vessel having a horizontal cross sectional size larger than the horizontal cross sectional size of the outer shell. An embodiment of the invention is one, any or all of prior embodiments in this paragraph up through the first embodiment in this paragraph, wherein the separation zone includes a vertical baffle extending downward from a top of the vessel in the separation zone. An embodiment of the invention is one, any or all of prior embodiments in this paragraph up through the first embodiment in this paragraph, wherein the hollow member comprises an outer hollow member, and wherein the reactor further comprises an inner hollow member disposed in the outer hollow member. An embodiment of the invention is one, any or all of prior embodiments in this paragraph up through the first embodiment in this paragraph, wherein the inner hollow member includes an open end and a closed end, and a plurality of discharge openings disposed between the open end and the closed end. An embodiment of the invention is one, any or all of prior embodiments in this paragraph up through the first embodiment in this paragraph, wherein the at least one static mixer is disposed in an annulus between the outer hollow member and the inner hollow member. An embodiment of the invention is one, any or all of prior embodiments in this paragraph up through the first embodiment in this paragraph further comprising a plurality of outer hollow members and a plurality of inner hollow members, each outer hollow member surrounding at least one inner hollow member. An embodiment of the invention is one, any or all of prior embodiments in this paragraph up through the first embodiment in this paragraph further comprising a manifold configured to receive an ionic liquid stream and distribute ionic liquid to the plurality of outer hollow members. An embodiment of the invention is one, any or all of prior embodiments in this paragraph up through the first embodiment in this paragraph further comprising a line configured to pass at least a portion of a reactor effluent from the reactor to a second reactor comprising an outer shell having an inlet for cooling fluid, an outlet for cooling fluid, and, at least one hollow member disposed inside of the outer shell of the second reactor.

A second embodiment of the invention is a reactor for an ionic liquid catalyzed alkylation reaction, the reactor comprising a plurality of vertically orientated sections arranged in series and a separation zone, wherein each vertically orientated section comprises an outer shell, a manifold, and a plurality of hollow members, the outer shell including an inlet for a cooling fluid and an outlet for the cooling fluid, the manifold configured to receive an ionic liquid stream and at least one hydrocarbon stream, and, the plurality of hollow members each having a first end in communication with the manifold, a second end, and at least one static mixer disposed between the first end and the second end, and, wherein the separation zone is disposed beneath the plurality of vertically orientated sections. An embodiment of the invention is one, any or all of prior embodiments in this paragraph up through the second embodiment in this paragraph wherein the manifold of each vertically orientated section is configured to receive a fresh hydrocarbon stream. An embodiment of the invention is one, any or all of prior embodiments in this paragraph up through the second embodiment in this paragraph wherein each hollow member from the plurality of hollow members includes at least two static mixers.

A third embodiment of the invention is a reactor for an ionic liquid catalyzed alkylation reaction, the reactor comprising an outer shell comprising, an inlet for a cooling fluid and an outlet for the cooling fluid, a plurality of outer hollow members disposed in the outer shell, an inner hollow member disposed in each of the outer hollow members, and each inner hollow member including an open end, a closed end, and plurality of discharge openings between the open end and the closed end, at least one static mixer disposed in the outer hollow member, and, a separation zone in communication with the plurality of hollow members and configured to separate an effluent into an ionic liquid stream and a hydrocarbon effluent stream. An embodiment of the invention is one, any or all of prior embodiments in this paragraph up through the third embodiment in this paragraph further comprising a first manifold configured to receive and distribute an ionic liquid catalyst stream, a second manifold configured to receive and distribute a first hydrocarbon stream, and, a third manifold configured to receive and distribute a second hydrocarbon stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A reactor for an ionic liquid catalyzed reaction, the reactor comprising:
   an outer shell, the outer shell including an inlet for a cooling fluid and an outlet for the cooling fluid;
   a hollow member disposed in the outer shell and having a first open end, a second open end opposite the first open end, and at least one static mixer disposed in the hollow member;
   a separation zone in fluid communication with the hollow member and configured to separate an effluent into an ionic liquid stream and a hydrocarbon stream; and
   wherein the outer shell has a horizontal cross sectional size, and wherein the separation zone comprises a vessel having a horizontal cross sectional size larger than the horizontal cross sectional size of the outer shell.

2. The reactor of claim 1 wherein the reactor further comprises a plurality of hollow members disposed in the outer shell, each hollow member comprising a first opening at a first end and a second opening at a second end opposite the first end, and at least one static mixer disposed in each hollow member.

3. The reactor of claim 2, wherein the reactor further comprises a manifold in fluid communication with the first ends of the hollow members.

4. The reactor of claim 3, wherein each hollow member includes at least one static mixer disposed at the first end of the hollow member and proximate the manifold.

5. The reactor of claim 4 further comprising at least one static mixer disposed at the second ends of the hollow members.

6. The reactor of claim 1 further comprising:
   a second outer shell disposed between the outer shell and the separation zone, the second outer shell comprising:
   an inlet for cooling fluid;
   an outlet for the cooling fluid;
   at least one hollow member disposed within the second outer shell, the at least one hollow member disposed within the second outer shell having a first open end, a second open end opposite the first end, and a static mixer disposed within the at least one hollow member disposed within the second outer shell.

7. The reactor of claim 6 further comprising:
   a plurality of hollow members disposed within both of the outer shell and the second outer shell;
   a manifold in fluid communication with the first open ends of the hollow members in the first outer shell; and
   a manifold in fluid communication with the second open ends of the hollow members in the first outer shell and the first open ends of the hollow members in the second outer shell.

8. The reactor of claim 1, wherein the separation zone includes a vertical baffle extending downward from a top of the vessel in the separation zone.

9. The reactor of claim 1, wherein the hollow member comprises an outer hollow member, and wherein the reactor further comprises an inner hollow member disposed in the outer hollow member.

10. The reactor of claim 9, wherein the inner hollow member includes an open end and a closed end, and a plurality of discharge openings disposed between the open end and the closed end.

11. The reactor of claim 9, wherein the at least one static mixer is disposed in an annulus between the outer hollow member and the inner hollow member.

12. The reactor of claim 9 further comprising a plurality of outer hollow members and a plurality of inner hollow members, each outer hollow member surrounding at least one inner hollow member.

13. The reactor of claim 12 further comprising a manifold configured to receive an ionic liquid stream and distribute ionic liquid to the plurality of outer hollow members.

14. The reactor of claim 1 further comprising:
   a line configured to pass at least a portion of a reactor effluent from the reactor to a second reactor comprising:
   an outer shell having an inlet for cooling fluid;
   an outlet for cooling fluid; and
   at least one hollow member disposed inside of the outer shell of the second reactor.

15. A reactor for an ionic liquid catalyzed alkylation reaction, the reactor comprising:
   an outer shell comprising an inlet for a cooling fluid and an outlet for the cooling fluid;
   a plurality of outer hollow members disposed in the outer shell;
   an inner hollow member disposed in each of the outer hollow members, and each inner hollow member including an open end, a closed end, and plurality of discharge openings between the open end and the closed end;
   at least one static mixer disposed in the outer hollow member; and
   a separation zone in communication with the plurality of hollow members and configured to separate an effluent into an ionic liquid stream and a hydrocarbon effluent stream;
   a first manifold configured to receive and distribute an ionic liquid catalyst stream;
   a second manifold configured to receive and distribute a first hydrocarbon stream; and
   a third manifold configured to receive and distribute a second hydrocarbon stream.

* * * * *